Patented Mar. 25, 1952

2,590,812

UNITED STATES PATENT OFFICE 2,590,812

SILOXANES HAVING HYDROGEN ATOMS DIRECTLY ATTACHED TO SILICON ATOMS

Arthur J. Barry, Midland, Mich., assignor to The Dow Chemical Company, Midland, Mich., a corporation of Delaware No Drawing. Application March 30, 1946, Serial No. 658,583

9 Claims. (Cl. 260—448.2)

This invention concerns new organo-silicon oxide condensation products and a method of making them.

The products of this invention are organo-polysiloxanes which contain in the molecule structural units of the formula:

in which R represents an alkyl radical containing at least two carbon atoms, an aralkyl radical, or a monovalent aromatic radical. The invention is particularly concerned with such organo-polysiloxanes containing a radical:

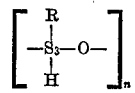

wherein R has the meaning just given and $n$ is a whole number greater than one. The organo-polysiloxanes having the general formulas just given contain silicon atoms having both hydrogen and an organic radical attached directly thereto. They differ in this regard from the class of organo-polysiloxanes commonly called "silicones," the molecules of which are based upon the radical $(R-)_xSi(-O-)_{4-x}$. For convenience, the new organo-polysiloxanes with which the invention is concerned are referred to as "silicals." It may be mentioned that "silical" is an expression coined on a basis of analogy between the structure of a unit radical, having the above general formula, and the molecular structure of an aldehyde.

In general, the silicals provided by this invention are liquid or semi-solid condensation products, although in some instances, e. g. in the instance of polymers in which the organic portion of the molecule consists of a hydrocarbon chain containing 14 or more carbon atoms, rigid solids may be obtained. The products may be composed of linear polymers containing two or more silicon atoms connected to each other by oxygen atoms, and terminated by end-blocking groups such as a hydroxyl group, (—OH), an alkoxy group, (—OR), a trialkylsiloxyl group (—OSiR₃), etc.; or they may be cyclic polymers containing three or more silicon atoms in the molecule. Frequently mixtures of the linear and cyclic types of polymers are obtained. They may also contain, in chemical combination with structural units of the above general formula, organo-siloxy radicals such as $RSi(-O-)_3$, $R_2Si(-O-)_2$, etc.

These new polymers undergo little change in consistency with change in temperature over a wide range, e. g. from —40° to 100° C. However, under suitable oxidizing conditions, the hydrogen atoms attached directly to the silicon atoms may be displaced by oxygen with the resultant formation of further oxygen linkages or bridges between the silicon atoms to give, as ultimate products, highly cross-linked polymers which are hard, insoluble resins. Hydrogen attached directly to silicon, hereinafter referred to as "silane hydrogen," may be determined by treating a known amount of a silical with an aqueous 7 per cent sodium hydroxide solution, in the presence of pyridine, at a temperature of about 25° C. and measuring the quantity of gaseous hydrogen evolved. In this operation, only the hydrogen attached directly to silicon atoms in the silical molecule reacts with the alkali to evolve gaseous hydrogen. The sodium hydroxide is employed in amount sufficient to cause reaction of all of the silane hydrogen. It is advantageously used in amount such that some alkali remains unreacted after completion of the test.

The silicals may be conveniently prepared by the hydrolysis of mono-organo-dihalosilanes having the general formula $RSiX_2H$, wherein R represents a monovalent hydrocarbon radical containing at least two carbon atoms and X is a halogen atom, which reaction is accompanied by a condensation of the silicon-containing hydrolysis products to form the polymers. The monovalent hydrocarbon radical of said formula may be an alkyl radical, e. g. ethyl, propyl, butyl, amyl, hexyl through octadecyl or higher; an aryl radical such as phenyl, or naphthyl; an aralkyl radical such as benzyl, or phenylethyl; or a modified or substituted aromatic hydrocarbon radical, such as p-methylphenyl, p-chlorophenyl, p-bromophenyl, p-ethoxyphenyl, etc.

The silicals provided by this invention are not obtainable by direct mixing of a mono-organo-dihalosilane with water at room temperature or above. Under these conditions of hydrolysis, gelatinous materials are produced, apparently because of cleavage not only of silicon to halogen bonds, but also of a large proportion of the silicon to hydrogen bonds, with the resultant formation of a highly cross-linked polymer.

It is important that the hydrolysis of a mono-organo-dihalosilane be carried out at a low temperature, e. g. 5° C. or lower, in order that a major portion of the silane hydrogen may remain unaffected by the hydrolysis. The order of mixing is of secondary importance. For instance, the water may be added slowly to the mono-organo-dihalosilane, or the latter may be added to the water, or the two may be run together as in a continuous mode of operation.

It has been found highly advantageous to conduct the hydrolysis in the presence of an inert solvent, e. g. an ether, an aliphatic or aromatic hydrocarbon, or a halohydrocarbon, etc. Usually from 0.5 to 3.0 parts by weight of solvent for each part of mono-organo-dihalosilane are employed, although more or less may be used. As a further precautionary measure, weakly alkaline substances such as sodium bicarbonate, sodium acetate, etc., may also be added to neutralize or buffer the hydrogen halide as it is formed in the hydrolysis.

When the hydrolysis is substantially complete, a large excess of water may be added, preferably at the low temperature, to dilute the hydrogen halide present in the reaction mixture. The aqueous layer containing the hydrogen halide is then withdrawn, and the residual layer containing the silical is washed several times with water while maintaining the same at temperatures of from 5° to 25° C. or thereabout. Final traces of residual halogen are usually neutralized with a weakly alkaline material such as ammonia gas, ammonium hydroxide or sodium bicarbonate. It has been found that neutralization of last traces of halogen eliminates any tendency towards subsequent gel formation in the silical. The resultant product may be further purified, e. g. by fractional distillation, if desired.

Silicals resulting from the hydrolysis and condensation reactions described above may be employed as intermediates in the preparation of resinous coatings for metals, ceramics, etc. In forming such coating, this silical is applied as a thin layer to the metal, or other base member, and subsequently is subjected to partial oxidation with air, whereby it is converted to a resinous coating on the base member. The silicals are also of value as boundary lubricants, e. g. for glass or other siliceous surface, hydrophobing agents for normally water wettable surfaces such as fibers, felt, paper, asbestos, ceramics, etc. The liquid silicals are suitable for employment as damping fluids in instruments, as hydraulic fluids for pressure actuatable devices, etc.

The following examples illustrate certain ways of applying the principle of the invention, but are not to be construed as limiting its scope:

EXAMPLE 1

Two gram mols of ethyl magnesium chloride were slowly added to, and reacted with, two gram mols of trichlorosilane in diethyl ether while stirring and maintaining the reaction mixture at a temperature of approximately —70° C. After standing overnight with continued stirring, the mixture had attained the temperature of the room. The coupling product was cooled in a bath of ice and salt, and water in excess of that required to react with the chlorine of the chlorosilane and to dissolve the magnesium chloride was added slowly and with stirring. The product was washed several times with water and the solvent removed by distillation. A colorless oil was obtained in 97 per cent yield. A portion of this oil was heated to boiling under reflux for 45 minutes, whereby there was formed a gel which was soluble in a mixture of 80 per cent toluene and 20 per cent ethanol. A small portion of the latter solution, when heated on a watch glass, gave a white rubbery film having a crinkled surface.

EXAMPLE 2

A solution of approximately 129 grams of ethyl-dichlorosilane (B. P. 74° C.–74.3° C./733–736 mm.), in 800 milliliters of diethyl ether was reacted with 500 grams of water while maintaining the reaction mixture at a temperature of 5° C., or below. Subsequently, the ethereal solution of the ethylsilical was washed with an aqueous 1 per cent NaHCO₃ solution and finally with distilled water. After removal of the solvent, the product was distilled. The following fractions were obtained:

| Boiling Range, °C. | mm. | Viscosity at 25° C.— Centistokes | Analysis | | |
|---|---|---|---|---|---|
| | | | Per Cent C | Per Cent Si | Per Cent H (Si–H) |
| 110–123 | 23 | 1.69 | 32.1 | 36.9 | 1.27 |
| 90–120 | 0.03–0.16 | 3.57 | 30.4 | 38.6 | 1.22 |
| Residue | | 37.2 | | | |

EXAMPLE 3

An ethereal solution containing 138 grams of ethyl-dichlorosilane was hydrolyzed by the addition of 200 grams of water while maintaining the reaction mixture at a temperature of 5° C. or below. The resultant oil was purified by washing several times with water and removing the solvent by distillation. The product consisted of 72.9 grams of a colorless oil having a viscosity of 7.8 centistokes at 20° C. Its index of refraction, $N_D^{20}$, and specific gravity, $$d_{20}^{20}$$

were respectively 1.4205 and 0.998. The average molecular weight as determined cyroscopically in cyclohexane was 574. Approximately 2.5 grams of the oil on a watch glass in an oven at 150° C. set to a gel in three hours.

EXAMPLE 4

To a mixture of 1.0 gram mol of ethyl-dichlorosilane and 0.2 gram mol of trimethyl-chlorosilane in an ether and benzene solution, was added slowly, with stirring, 200 grams of water. During the addition, the reaction mixture was maintained at a temperature of 10° C. or below. The product was washed several times with cold distilled water, after which ammonia gas was bubbled through for several minutes. The resultant oil was filtered, and subsequently heated to approximately 150° C. at 11 millimeters absolute pressure to remove volatile components, e. g. solvent and low-boiling polymers. The residual clear, colorless, oily liquid had a viscosity of 5.08 centistokes at 20° C., and a specific gravity, $$d_{20}^{20}$$

of 0.9666. Its index of refraction, $N_D^{20}$, was 1.4172. The oil consisted predominantly of linear polymers of

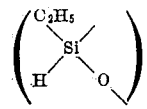

units, terminated with (CH₃)₃Si— groups.

The following table shows the viscosity-temperature relationship between four liquids having close to the same viscosity values at 79.5° C.: (1) trimethyl-endblocked ethyl silical similar to that prepared in Example 4, (2) cyclic ethyl silical similar to that prepared in Example 3, (3) a cyclic diethyl siloxane polymer prepared by the reaction of diethyl dichlorosilane with water, and (4) a standard viscosity mineral oil, H-1, provided by the United States Bureau of Standards:

Table

| Fluid | Viscosity in Centistokes | | | |
|---|---|---|---|---|
| | 79.5°C. | 20°C. | 0-1°C. | -40°C. |
| Trimethyl-endblocked ethyl silical | 2.31 | 5.08 | 7.19 | 21.85 |
| Cyclic ethyl silical | 3.42 | 8.23 | 11.72 | 38.53 |
| Cyclic diethyl siloxane polymer | 3.87 | 12.50 | 22.88 | |
| Mineral Oil | 2.37 | 9.02 | 18.63 | Solid |

From the data given in the table, it may be seen that ethyl silicals possess smaller rates of change in viscosity per degree change in temperature than are possessed by diethyl siloxane polymers.

EXAMPLE 5

The compound, n-propyl-dichlorosilane (B. P. 100-101° C./747 mm.), was reacted with water by procedure similar to that described in Example 3. A colorless oil was obtained which had a viscosity of 9.1 centistokes at 20° C., and a specific gravity, $$d_{20}^{20}$$

of 0.9854. Its index of refraction, $N_D^{20}$, was 1.4289. A portion of this material, approximately 2.5 grams, on a watch glass, was placed in an oven maintained at 150° C. At the end of five hours, a skin had formed at the surface of the liquid. At the end of six hours, the material had set to a firm gel. This skin formation at the surface over an otherwise soft body, results in a resin which is resistant to abrasion, but which retains flexibility and elasticity.

EXAMPLE 6

The compound, isopropyl-dichlorosilane (B. P. 95° C./742 mm.), and water were reacted, and the oily product collected and purified in a manner similar to that described in Example 3. After washing with water, and removal of solvent, the residual colorless oil had a specific gravity, $$d_{20}^{20}$$

of 0.967. Its index of refraction, $N_D^{20}$, was 1.4287. It had the following analysis: carbon, 40.9 per cent; silicon, 33.4 per cent; silane hydrogen, 1.08 per cent.

EXAMPLE 7

The compound, n-butyl-dichlorosilane (B. P. 126-7° C./741 mm.), was hydrolyzed and the condensation product collected and purified as in Example 3. There was obtained a colorless oil, having a specific gravity, $$d_{20}^{20}$$

of 0.953, and an index of refraction, $N_D^{20}$, of 1.4347. A 2.5 gram portion of the oil on a watch glass was placed in an oven at 150° C. At the end of 9 hours, it had set to a gel.

EXAMPLE 8

The compound, isobutyl-dichlorosilane (B. P. 119.25° C./740 mm.), was reacted with water and the product collected and purified as in Example 3. A colorless oil was obtained which had a specific gravity, $$d_{20}^{20}$$

of 0.961; and an index of refraction, $N_D^{20}$, of 1.4330. It contained 46.7 per cent carbon and 1.00 per cent silane hydrogen.

EXAMPLE 9

By procedure similar to that described in Example 3, amyl-dichlorosilane (B. P. 150-153° C./739 mm.), was reacted with water and the reaction products were collected and purified. A colorless oil was obtained which had the following analysis: carbon, 52.6 per cent; silicon, 23.6 per cent; silane hydrogen, 0.83 per cent.

EXAMPLE 10

A mixture of $C_{12}H_{25}SiHCl_2$ and $C_{14}H_{29}SiHCl_2$, having a boiling range of from 156° C. to 158° C. at 15 mm. absolute pressure, was hydrolyzed and the condensation product was collected and purified by procedure similar to that in preceding examples. A pasty material, which was semi-solid at room temperature and had a waxy feel, was obtained. A thin film of the pasty product was wiped onto a wire coated with a hard organosiloxane enamel. It was found that the resistance to abrasion was increased thereby almost 85 per cent when measured under standard test conditions. A portion of the silical on a watch glass was heated in an oven at 150° C. At the end of 24 hours, a skin had formed over the surface; and at the end of 30 hours the product had set to a firm gel.

Clean glass plates were immersed in a 0.1 per cent by weight solution, in benzene, of the polysilical of this example and dried until tack-free. The coefficient of friction was then determined in accordance with the method of Langmuir, Proc. Roy. Soc., A170 (1939), page 18. In this method, there is measured the angle through which the plate must be tipped away from a horizontal position in order to cause movement of a glass rider placed thereon. The tangent of said angle is a measure of the coefficient of friction of the surface. For the glass plates coated with the polysilical, the tangent of the angle was 0.14 as compared with 1.46 for the untreated plate. The coated plates were unaffected by the action of a strong stream of distilled water, or by methanol, acetone, benzene, or toluene. Storage in air at room temperature for one month resulted in no change in the coefficient of friction.

EXAMPLE 11

By procedure similar to that described in Example 3, benzyl-dichlorosilane (B. P. 117.5° C./51 mm.), was reacted with water, and the reaction products were collected and purified. A colorless oil was obtained, which had a specific gravity, $$d_{20}^{20}$$

of 1.144, and an index of refraction, $N_D^{20}$, of 1.5619. Analysis showed 62.2 per cent carbon, 20.8 per cent silicon, 0.77 per cent silane hydrogen.

EXAMPLE 12

By procedure similar to that employed in preceding examples, phenyl-dichlorosilane (B. P. 98° C./51 mm.), was reacted with water, and the reaction products were collected and purified. There was obtained a thin, colorless oil, which, when heated to approximately 110° C. for 100 hours was converted to a clear, rubbery gel. Another portion of the oil was heated for 4 hours at 200° C., after which air was bubbled through it for 8 hours at 200° C. A very viscous product resulted, which was found to have set up to an insoluble resin after storage at room temperature for several days.

EXAMPLE 13

In a manner similar to that described in preceding examples, naphthyl-dichlorosilane was hydrolyzed to form naphthyl silical. The latter was obtained as a firm-textured, flexible solid material having the following composition: carbon, 68.6 per cent; silicon 16.2 per cent; silane hydrogen, 0.57 per cent. A solution consisting of 70 parts by weight of the condensation product and 30 parts of benzene was prepared. A test panel of copper sheeting was coated therewith by dipping. After evaporation of the solvent by air drying, a tacky coating remained. The coated panel was then heated for approximately one hour at 250° C., at which time the coating was found to be tack-free. After heating the coated panel for 90 hours at 250° C., the coating did not crack on bending the panel over a one-eighth inch mandrel.

EXAMPLE 14

Operating in a manner similar to that described in the preceding examples, p-methylphenyl-dichlorosilane was hydrolyzed to form p-methylphenyl silical. The latter was obtained as a colorless oil, having a specific gravity, $d_{20}^{20}$ of 1.131. Its index of refraction, $N_D^{20}$, was 1.5582.

EXAMPLE 15

By procedure similar to that described in preceding examples, p-chlorophenylsilical was prepared by the hydrolysis of p-chlorophenyl-dichlorosilane. The product was obtained as a colorless liquid having a refractive index, $N_D^{20}$, of 1.5833. Analysis showed a content of 46.1 per cent carbon, 18.4 per cent silicon, 0.56 per cent silane hydrogen, and 22.8 per cent chlorine.

EXAMPLE 16

A mixture of mono-organo-dichlorosilanes, in which the organic radicals consisted essentially of hydrocarbon chains containing an average of from 16 to 18 carbon atoms, and which distilled at approximately 182° C. at 0.4 mm., was reacted with water and the condensation product was collected and purified as in the preceding examples. The product was a hard, brittle, wax-like solid at room temperature, which became completely fluid at approximately 100° C.

The mode of hydrolysis of this invention is not necessarily limited to the use of mono-organo-dihalosilanes as starting materials, but may also be advantageously applied to any silicon compound which contains silane hydrogen in the molecule, for the preparation of condensation products which retain substantially all of said hydrogen attached to the silicon atoms in the polymer molecule.

This invention likewise provides a method for the cohydrolysis and cocondensation of mono-organo-dihalosilanes with other readily hydrolyzable silanes, whereby there are produced copolymers which contain in the molecule one or more of the structural units:

as illustrated in the following examples:

EXAMPLE 17

By procedure similar to that described in Example 4, a mixture comprising 1 gram mol of ethyl-dichlorosilane and 1 gram mol of dimethyl-dichlorosilane was reacted with water in the presence of ether. The oily liquid was washed several times with water, after which ammonia gas was bubbled through. Subsequently, the product was filtered. A slightly cloudy yellowish oil was obtained. It had a viscosity of 25.8 centistokes at 20° C., a refractive index, $N_D^{20}$, of 1.4156, and a specific gravity, $d_{20}^{20}$ of 0.9949.

EXAMPLE 18

To a solution comprising 820 grams (4 mols) of ethylphenyl-dichlorosilane and 129 grams (1 mol) of ethyldichlorosilane in 300 milliliters of ethyl ether, was added slowly and with stirring approximately 500 grams of water. During the addition, the reaction mixture was kept cool by immersion in an ice-bath. The ether layer was then separated, washed several times with cold distilled water, then with aqueous 1 per cent solution of sodium bicarbonate. After storage overnight in contact with aqueous 1 per cent sodium bicarbonate, the product was again washed several times with water and heated on a steam bath under reduced pressure to vaporize the solvent and low-boiling components. The residual clear, colorless oil had a specific gravity, $d_{20}^{20}$ of 1.0993; its refractive index, $N_D^{20}$, was 1.5287; its viscosity at 25° C. was 120 centistokes.

The oil was heated at 230° C. for about 100 hours while bubbling air therethrough. A very viscous product was obtained which was applied to metal panels as a film 1.3 mils thick. The coated panel dried to a tack-free state upon heating for 5 hours at 250° C.

EXAMPLE 19

The procedure described in Example 18 was repeated, except that a mixture of 1435 grams (7 mols), of ethylphenyl-dichlorosilane and 387 grams (3 mols), of ethyl-dichlorosilane was employed. The product was washed, neutralized and freed of solvent as before. The residual oil was clear and colorless and had a viscosity of 122.2 centistokes at 25° C. Analysis showed a content of 0.23 per cent of silane hydrogen. The oil was blown with air for 20.5 hours at 230° C., whereby a very viscous product was obtained which contained 0.037 per cent of silane hydrogen. A portion of this product was spread over a metal panel as a film of 1.5 mils thickness and the test piece was placed in an oven maintained at a temperature of 250° C. The film dried to a tack-free condition in 2 hours.

By procedure similar to that illustrated in Examples 17–19, copolymers may also be prepared from mixtures of ethyl-dibromosilane and diphenyl-dichlorosilane; phenyl-dichlorosilane and diethyl-monochlorosilane; dodecyl-dichlorosilane and dodecyl-ethyl-monochlorosilane; methyl-dichlorosilane, diphenyl-monochlorosilane and silicon tetrachloride; dodecyl-monochlorosilane and trimethyl-chlorosilane; octadecyl-monochlorosilane, dipropyl-dichlorosilane, and trichlorosilane; phenyl-monochlorosilane and diphenyl-dichlorosilane; etc.

This application is a continuation-in-part of my copending applications, Serial No. 556,913, filed October 2, 1944; Serial No. 620,387, filed October 4, 1945; and Serial No. 645,490, filed February 4, 1946, all now abandoned.

Other modes of applying the principle of the invention may be employed instead of those explained, change being made as regards the method and materials herein disclosed, provided the steps or compounds stated by any of the following claims or equivalent of such steps or compounds be employed.

I therefore point out and claim as my invention:

1. An organo-silicon oxide condensation product having hydrogen atoms attached directly to silicon atoms of the molecule, which product is of the group consisting of (a) cyclic polysiloxanes having the general formula:

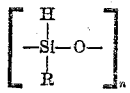

wherein R represents a monovalent hydrocarbon radical containing at least two carbon atoms and selected from the group consisting of alkyl, aralkyl and aromatic radicals, and $n$ is an integer greater than 2, (b) linear polysiloxanes comprising an organo-siloxane chain having the formula:

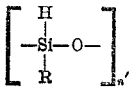

wherein R has the above meaning and $n'$ is an integer greater than 1, which organo-siloxane chain is terminated by radicals of the group consisting of hydroxyl, alkoxy and trialkylsiloxyl radicals, and (c) copolymeric polysiloxanes composed essentially of

radicals interspersed with

radicals wherein R' and R'' each individually represents a monovalent hydrocarbon radical of the group consisting of methyl and phenyl radicals.

2. A linear polysiloxane, as claimed in claim 1, wherein R of the formula represents an alkyl radical containing at least two carbon atoms.

3. A cyclic organo-silicon oxide condensation product having the general formula:

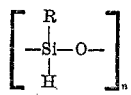

in which R represents a monovalent hydrocarbon radical containing at least two carbon atoms, and selected from the group consisting of alkyl, aralkyl and aromatic radicals and $n$ is a whole number greater than 2.

4. A cyclic organo-silicon oxide condensation product having the general formula:

$$\left[ \begin{array}{c} R \\ -Si-O- \\ H \end{array} \right]_n$$

in which R represents an alkyl radical containing at least two carbon atoms, and $n$ is a whole number greater than 2.

5. A cyclic organo-silicon oxide condensation product having the general formula:

$$\left[ \begin{array}{c} R \\ -Si-O- \\ H \end{array} \right]_n$$

in which R represents an alkyl radical containing at least 12 carbon atoms, and $n$ is a whole number greater than 2.

6. A cyclopolysiloxane corresponding to the general formula $(RSiHO)_n$, where R represents a lower alkyl radical having at least 2 carbon atoms, and $n$ is an integer greater than 3.

7. A linear polysiloxane corresponding to the general formula

where each R represents an alkyl radical, R' represents a lower alkyl radical having at least 2 carbon atoms and $n$ is an integer greater than 1.

8. A monoamylsiloxane having the general formula:

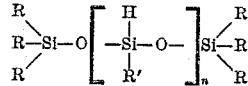

wherein $n$ is an integer greater than 2, Y is a radical of the group consisting of hydroxyl, alkoxy and trialkylsiloxyl radicals and $n''$ is one of the integers zero and two.

9. A copolymer polysiloxane composed essentially of ethyl HSiO radicals and $(CH_3)_2SiO$ radicals.

ARTHUR J. BARRY.

REFERENCES CITED

The following references are of record in the file of this patent:

UNITED STATES PATENTS

| Number | Name | Date |
|---|---|---|
| 2,258,220 | Rochow | Oct. 7, 1941 |
| 2,265,962 | Bent et al. | Dec. 9, 1941 |
| 2,306,222 | Patnode | Dec. 22, 1942 |
| 2,383,521 | Sawa | Aug. 28, 1945 |
| 2,386,259 | Norton | Oct. 9, 1945 |

OTHER REFERENCES

Hyde: J. A. C. S., 63 (1941), pages 1194–6.
Volnov: "Jour. Gen. Chem.," U. S. S. R., vol. 10 (1940), pages 1600–1604.